No. 776,677. PATENTED DEC. 6, 1904.
W. W. PADDOCK.
PRESSURE FILTER.
APPLICATION FILED AUG. 6, 1903.
NO MODEL. 2 SHEETS—SHEET 2.

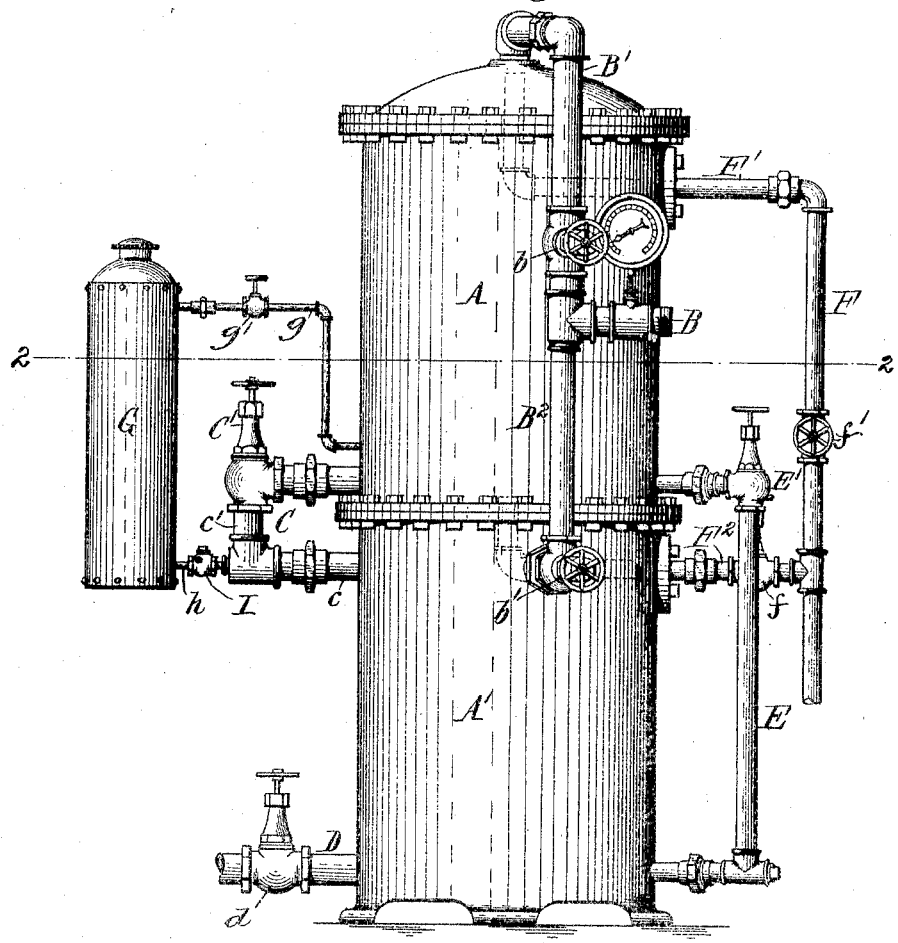
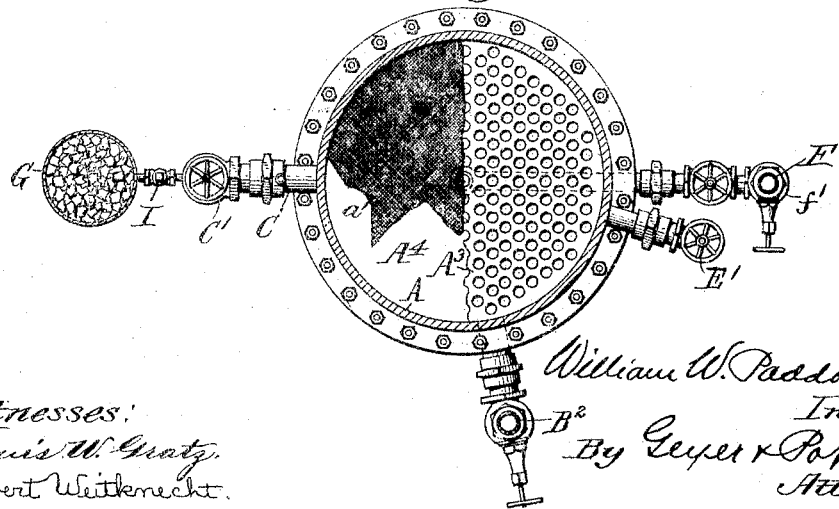

Witnesses:
Louis W. Gratz.
Robert Weitknecht.

William W. Paddock,
Inventor
By Geyer & Popp
Attorneys

No. 776,677.

Patented December 6, 1904.

UNITED STATES PATENT OFFICE.

WILLIAM W. PADDOCK, OF BUFFALO, NEW YORK.

PRESSURE-FILTER.

SPECIFICATION forming part of Letters Patent No. 776,677, dated December 6, 1904.

Application filed August 8, 1903. Serial No. 168,745. (No model.)

*To all whom it may concern:*

Be it known that I, WILLIAM W. PADDOCK, a citizen of the United States, residing at Buffalo, in the county of Erie and State of New York, have invented new and useful Improvements in Pressure-Filters, of which the following is a specification.

This invention relates more particularly to pressure-filters composed of a number of superposed sections or compartments and provided with suitable pipe connections and valves, whereby the filter-bed of each section can be cleaned by a current of pure water obtained by filtering the same through one or more of the other filter-sections. A filter of this kind is shown and described in Letters Patent of the United States No. 636,447, granted to me November 7, 1899.

One of the objects of my present invention is the provision of a double or two-section filter of this character which shall be simple in construction and which can be conveniently cleaned.

A further object of the invention is to improve the construction and arrangement of the cleaning-pipes with a view of preventing clogging of the same, producing a practically uniform agitation of all portions of the filter-beds and insuring a thorough cleaning of the latter.

The invention has the further object to provide the filter with simple means for supplying a suitable coagulant to the same and to so construct the apparatus as to avoid feeding an excessive quantity of the coagulant into the filter and rendering the water unpalatable.

Figure 3:
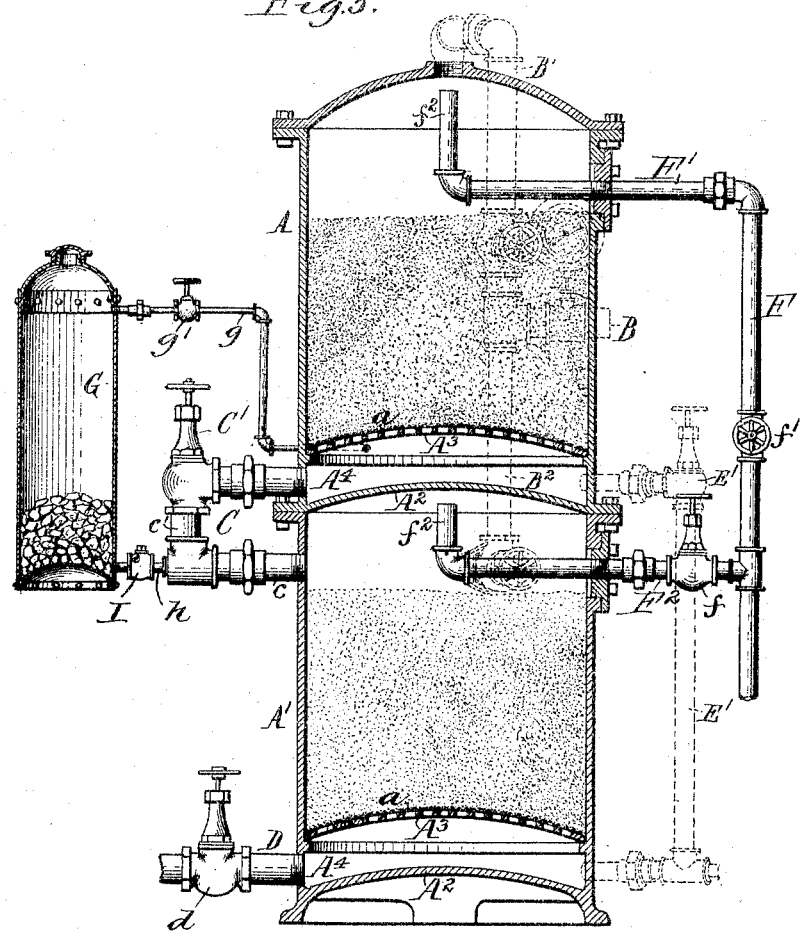
Figure 4:
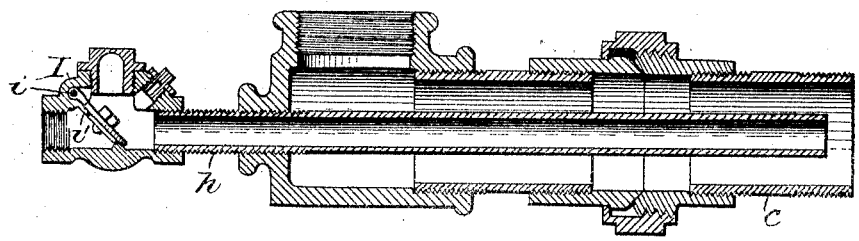

In the accompanying drawings, consisting of two sheets, Figure 1 is a side elevation of a two-section filter embodying my invention. Fig. 2 is a horizontal section thereof in line 2 2, Fig. 1. Fig. 3 is a sectional elevation of the filter. Fig. 4 is an enlarged longitudinal section of the discharge-pipe of the alum-tank and the water-pipe into which it extends.

Similar letters of reference indicate corresponding parts throughout the several views.

The filter shown in the drawings comprises two cylindrical sections, chambers, or compartments A A′, preferably arranged one above the other; but some features of my invention are also applicable to filters having a single chamber or more than two sections or compartments. Each of these sections contains a bed of suitable filtering material, such as sand, and each section is provided with an imperforate bottom $A^2$ and a short distance above the same with a perforated diaphragm $A^3$, leaving a chamber $A^4$ for pure or filtered water between the bottom and the diaphragm. A strainer $a$, of gauze or other suitable material, is preferably applied to the upper side of each perforated diaphragm $A^3$. The bottom of the upper filter-section forms the head of the lower section, and the two sections are provided at their adjoining ends with projecting flanges, through which pass vertical fastening-bolts, as shown.

B is the main inlet-pipe for the unfiltered water, and B′ $B^2$ are branch pipes leading from said pipe to the upper portions of the filter-sections, respectively, and provided with hand-valves $b$ $b'$.

The pure-water chamber $A^4$ of the upper filter-section A communicates with the upper portion of the lower section A′, preferably by an external pipe C, having a hand-valve C′.

D is the delivery-pipe for the filtered water, leading from the pure-water chamber $A^4$ of the lower filter-section A′ and provided with a valve $d$.

E is a by-pass or pipe connecting the pure-water chambers $A^4$ of the two filter-sections and provided with a hand-valve E′. This pipe forms a connection through which filtered water is conducted from the bottom of one filter-bed to the bottom of the other for washing the last-named bed by an ascending or reverse current of filtered water. In the drawings only one of such by-passes is shown, but, if desired, a number of the same may be employed on different sides of the filter.

F is a main cleaning or washout pipe which is connected with the upper portions of the filter-sections A A′ by branch pipes F′ $F^2$. The lower branch pipe $F^2$ has a hand-valve $f$, and the main cleaning-pipe F is provided above said pipe with a similar valve $f'$; but, if desired, the last-named valve may be arranged in the upper branch F′ of the cleaning-pipe. The branch pipes F′ $F^2$ preferably extend horizontally through the walls of the filter-sections, and each terminates in an upwardly-extending pipe or nozzle $f^2$, which is arranged centrally in the space above the adjacent filter-bed, as shown in the drawings. The upper ends of these nozzles preferably have no gauze coverings or similar strainers which are liable to become clogged with sand, and in order to prevent the filter-beds from being washed out through these nozzles in cleaning the filter the nozzles are extended some distance above the beds, as shown in Fig. 3.

G indicates a tank or receptacle adapted to contain a solution of alum or other suitable coagulant, which is fed into the filter for agglomerating the impurities in the water and causing the same to be more effectually intercepted by the filter-beds in a well-known manner. The tank is provided at its upper end with a capped opening for the introduction of the alum and is supplied with water by a pipe $g$, leading, preferably, from the pure-water chamber $A^4$ of the upper filter-section to the upper portion of the tank and having a hand-valve $g'$.

$h$ is the discharge-pipe of the tank leading from the lower portion thereof and preferably connected with the lower horizontal branch $c$ of the connecting-pipe C, so that the alum solution is delivered into the upper portion of the lower filter-section. The discharge-pipe $h$ preferably extends into the branch $c$ some distance beyond the vertical portion $c'$ of said connecting-pipe and is considerably smaller in diameter than the branch pipe, as shown in Fig. 4, so as to leave a space between the two pipes for the passage of the water from the upper to the lower filter-section. By this construction the pipes $h$ and $c'$ form an injector which withdraws the alum solution from the tank and delivers it into the lower filter-section whenever water is drawn from the filter through the delivery-pipe D.

An automatic or check valve I, which opens toward the body of the filter and closes toward the alum-tank, is preferably arranged in the discharge-pipe $h$ of the tank for checking or preventing the flow of the alum solution into the filter except when water is drawn off. For this purpose I prefer to employ an ordinary swinging check-valve, such as shown in Fig. 4. This valve is pivoted to its casing at its upper end, as shown at $i$, and rests loosely upon the inclined diaphragm $i'$ of the casing. When the delivery-pipe D is closed, the water-pressure in the filter and the alum-tank is equalized, and under these conditions the check-valve I remains closed by gravity and prevents the alum water or solution from flowing into the filter. When water is drawn from the filter, the pressure in the upper filter-chamber A and in the alum-tank preponderates over the pressure in the lower filter-chamber A' and overcomes the resistance of the check-valve I, thereby opening this valve and allowing the alum solution to flow into the lower filter-section so long as water is drawn from the filter. Upon closing the delivery-pipe D the pressure is again equalized in the filter and the alum-tank, allowing the check-valve I to close by gravity and stopping the supply of the coagulant to the filter. In this manner a comparatively small quantity of the coagulant is fed into the filter at a time and the objection of delivering an excessive amount into the filter and causing the water to taste of alum is obviated. The check-valve I is made of the proper weight to operate as above described.

By connecting the water-supply pipe $g$ of the alum-tank with the pure-water chamber $A^4$ of the upper filter-section A filtered water is supplied to the tank and the delivery of muddy or unfiltered water into the lower filter-section is avoided.

In the normal operative condition of the filter the valve $b$ of the upper inlet branch B' and the valve C' of the connecting-pipe C are open and the remaining valves $b'$, E', $f$, and $f'$ are closed. The unfiltered water entering the upper filter-section A above its sand bed now percolates through this bed into the upper pure-water chamber $A^4$, passes from the latter through the connecting-pipe C into the upper portion of the lower filter-section A and percolates through the bed of the latter, finally entering the lower pure-water chamber $A^4$, from which it is drawn when desired through the delivery-pipe D.

When it is desired to clean the lower filter-section A', the valve $b$ of the upper inlet branch B', the valve E' of the by-pass E, and the valve $f$ of the lower cleaning branch $F^2$ are opened, and the remaining valves $b'$, C', and $f'$ are closed. The unfiltered water is now shut off from the lower filter-section A' and the incoming water after descending through the bed of the upper section A and being thereby filtered enters the upper pure-water chamber $A^4$, descends through the by-pass E into the lower pure-water chamber $A^4$, passes in the reverse direction through the filter-bed of the lower section, and escapes through the nozzle $f^2$ of said section and the lower cleaning branch $F^2$ into the main cleaning-pipe F, which latter conducts the unclean water to the sewer.

To clean the upper filter-section A, the valve $b'$ of the lower inlet branch $B^2$, the valve E' of the by-pass E, and the valve $f'$ of the main cleaning-pipe F are opened and the remaining valves $b$, C', and $f$ are closed. The unfiltered water which is now cut off from the upper filter-section enters the upper portion of the lower section, descends through the bed thereof into the lower pure-water chamber $A^4$, thence rises through the by-pass E into the upper pure-water chamber and ascends through the bed of the upper filter-section and finally escapes through the nozzle $f^2$ of said section and the upper cleaning branch F' into and through the main cleaning-pipe F. In this manner the bed of each filter-section is cleaned by filtered water obtained by previously passing the same through the bed of the other section.

In cleaning the filter the valve $g'$ in the supply-pipe of the alum-tank is closed to prevent the delivery of the coagulant into the filter during that operation.

By arranging the exit or cleaning nozzles $f^2$ centrally in the upper portions of the filter-sections the water in cleaning the filter ascends from all sides of the pure-water chambers $A^4$ toward said central nozzles, causing all portions of the bed to be loosened and agitated and insuring a thorough and uniform cleaning of the same. By extending the cleaning-nozzles upwardly some distance above the surface of the filter-beds their upper ends may be left open for insuring a free and unobstructed discharge of the muddy water without liability of washing out a significant portion of the sand beds.

I claim as my invention—

1. The combination of a pair of filter-sections, a pipe or conduit connecting the bottom of one section with the top of the other section, a main inlet-pipe having valved branch pipes leading respectively to the upper portions of said filter-sections, a valved by-pass independent of said branch pipes connecting the lower portions of the two sections, and a cleaning-pipe connected with the upper portions of said sections, substantially as set forth.

2. The combination of a pair of filter-sections arranged one above the other and each provided in its bottom with a pure-water chamber, an external pipe connecting the pure-water chamber of the upper filter-section with the upper portion of the lower section and having a valve, a main inlet-pipe having valved branch pipes leading respectively to the upper portions of said filter-sections, a valved by-pass independent of said branch pipes connecting the pure-water chambers of the two sections, and a cleaning-pipe connected with the upper portions of said sections and having valves for permitting the discharge of water from one of the sections through said pipe and preventing the discharge of water from the other section through said pipe, substantially as set forth.

3. In a pressure-filter, the combination with a filter-chamber having a water-inlet and an outlet of a closed coagulant-tank, a water-supply pipe leading from the filter-chamber to said tank, a discharge-pipe leading from said tank to said chamber, and an automatic valve arranged in said discharge-pipe and adapted to close when the pressure is equalized in the chamber and the tank and to open when the pressure in the lower portion of the chamber is reduced by opening the outlet thereof, substantially as set forth.

4. The combination of a pair of filter-sections or compartments, a connecting-pipe leading from the bottom of one of said sections to the top of the other, a closed coagulant-tank, a water-supply pipe leading from one of said sections to the coagulant-tank, a discharge-pipe leading from said tank and extending into said connecting-pipe and separated from the latter by an intervening water-space, and an automatic valve arranged in said discharge-pipe, substantially as set forth.

5. The combination of a pair of filter-sections arranged one above the other, a connecting-pipe leading from the bottom of the upper section to the top of the lower section, a coagulant-tank, a supply-pipe leading from the upper filter-section to said tank, a discharge-pipe leading from said tank and extending into the lower portion of said connecting-pipe, said discharge and connecting pipes being separated by an intervening water-space, and a gravity-valve arranged in said discharge-pipe between the tank and said connecting-pipe, substantially as set forth.

6. The combination of a pair of filter-sections arranged one above the other, a connecting-pipe leading from the bottom of the upper section to the top of the lower section, and a coagulant-tank having a discharge-pipe leading to said connecting-pipe, substantially as set forth.

7. The combination of a pair of filter-sections arranged one above the other, the upper chamber being provided in its bottom with a pure-water chamber, a coagulant-tank, a supply-pipe leading from said pure-water chamber to said tank, and a discharge-pipe leading from the tank to the upper portion of the lower filter-section, substantially as set forth.

Witness my hand this 7th day of August, 1903.

WILLIAM W. PADDOCK.

Witnesses:
CARL F. GEYER,
EMMA M. GRAHAM.